United States Patent [19]

Takarada

[11] Patent Number: 4,988,788

[45] Date of Patent: Jan. 29, 1991

[54] ROOM TEMPERATURE-CURABLE COATING COMPOSITION

[75] Inventor: Mitsuhiro Takarada, Annaka, Japan

[73] Assignee: Shin-Etsu Chemical Co., Ltd., Japan

[21] Appl. No.: 216,838

[22] Filed: Jul. 8, 1988

Related U.S. Application Data

[63] Continuation-in-part of Ser. No. 134,360, Dec. 17, 1987, abandoned.

[30] Foreign Application Priority Data

Dec. 29, 1986 [JP] Japan .................................. 61-310938

[51] Int. Cl.$^5$ ............................................. C08F 230/08
[52] U.S. Cl. ..................................... 526/279; 528/26; 528/32; 528/34
[58] Field of Search ................... 525/479; 526/279; 528/32, 26, 34

[56] References Cited

U.S. PATENT DOCUMENTS

| | | | |
|---|---|---|---|
| 3,203,919 | 8/1965 | Brachman | 528/32 |
| 3,467,634 | 9/1969 | Jacknow et al. | 526/279 |
| 3,951,893 | 4/1976 | Gander et al. | 526/279 |
| 3,966,687 | 6/1976 | Ribba | 526/279 |
| 4,043,953 | 8/1977 | Chang et al. | 528/32 |
| 4,564,557 | 1/1986 | Ohgushi et al. | 428/333 |
| 4,625,006 | 11/1986 | Bernhardt | 526/279 |

*Primary Examiner*—John C. Bleutge
*Assistant Examiner*—Ralph Dean, Jr.
*Attorney, Agent, or Firm*—Wyatt, Gerber, Burke & Badie

[57] ABSTRACT

The room temperature-curable coating composition comprises, as the resinous vehicle thereof, a copolymer prepared by the radical copolymerization of a ternary monomeric mixture composed of (A) 20-80% by weight of an alkyl (meth)acrylate, e.g., methyl methacrylate, (B) 10-78% by weight of an oligomeric organopolysiloxyanylalkyl (meth)acrylate, e.g., 1,1,1,3,5,5,5-heptamethyl-3-(3-methacryloxypropyl) trisiloxane, and (C) 2-30% by weight of an organosilane compound having at least one hydroxyzable group and a radical-polymerizable unsaturated group, e.g., 3-methacryloxypropyl trimethoxy silane. The coating composition gives a cured coating film having outstandingly high weatherability and resistance against ultraviolet light, water and chemicals in comparison with conventional room temperature-curable acrylic resin-based coating compositions.

10 Claims, No Drawings

ROOM TEMPERATURE-CURABLE COATING COMPOSITION

BACKGROUND OF THE INVENTION

This is a continuation-in-part application from a copending U.S. patent application Ser. No. 07/134,360 filed Dec. 17, 1987.

The present invention relates to a room temperature-curable coating composition or, more particularly, to a room temperature-curable coating composition having excellent weatherability and little susceptibility to deposition of dirt and adhesion of snow by virtue of the very low surface energy.

As a trend in recent years, coating compositions are required to be room temperature-curable and still highly resistant against weathering from the standpoint of energy saving and enhancement of the efficiency in the coating works. In this regard, acrylic resin-based coating compositions are generally preferred in respect of the easiness in the manufacture of the resin and good weatherability and high mechanical strengths of the coating film formed therefrom. The curing mechanism in these acrylic resin-based coating compositions is the crosslinking reaction of a hydroxyalkyl-containing acrylic resin with an isocyanate compound as a crosslinking agent or the crosslinking reaction by the hydrolysis and silanolic condensation of an acrylic resin having hydrolyzable silyl groups.

One of the major disadvantages in the coating compositions curable by the former mechanism of curing is caused by the toxicity of the isocyanate compound which in itself is irritative to human skin and must be manufactured by using dangerous phosgene gas as one of the reactants. This problem of safety is the reason for the continuous shift of the preference in recent years from the isocyanate-curable coating compositions toward the silanol-curable ones.

A silanol-curable coating composition proposed in Japanese Patent Kokai Nos. 57-36109 and 58-155666 uses a resinous constituent which is a copolymer of 3-methacryloxypropyl trimethoxy silane and a radical-polymerizable monomer. Coating compositions of this type, however, have a disadvantage due to the relatively low density of crosslink-dorming siloxane linkages, which cannot be high enough, that the surface luster of the coating film thereof is lost by a prolonged outdoor exposure though with somewhat better weatherability than the isocyanate-curable coating compositions.

An alternative method is proposed in Japanese Patent Kokai No. 61-151272 according to which a siloxane moiety is introduced into an acrylic resin by the anionic polymerization of a cyclic trimer of dimethyl siloxane. This method is disadvantageous due to the difficulties in the complete dehydration of the reaction mixture and control of the polymerization reaction which limit the industrial applicability of the method for the mass production of the product.

Still another method proposed in Japanese Patent Kokai No. 59-20360 utilizes a copolymerization reaction of a radical-polymerizable monomer with a siloxane-containing monomer which is obtained by the dehydrochlorination reaction between 3-methacryloxypropyl methyl dichlorosilane and an α,ω-dihydroxy dimethyl polysiloxane. This method has a problem that it is not suitable for the manufacture of a coating composition containing a non-volatile matter of a high degree of polymerization in a sufficiently high concentration due to the difficulty in smoothly performing the dehydrochlorination reaction which must be followed by the removal of the hydrochloride of an acid acceptor precipitated in the reaction mixture.

Further, a method is proposed in Japanese Patent Kokai No. 55-129405 according to which a copolymer of allyl methacrylate and one or more of other radical-polymerizable monomers is subjected to an addition reaction with a hydrosilane compound having a hydrolyzable functional group in the presence of a platinum catalyst followed by the hydrolysis and silanol condensation of the hydrolyzable groups to introduce crosslinking siloxane linkages and to improve the weatherability of the coating composition. This method is disadvantageous because of the complicate sequence of the reactions and difficulty in the control of the hydrolysis reaction.

Japanese Patent Kokai No. 57-34107 teaches a method using a fluorine-containing copolymer but this method does not provide general-purpose coating compositions due to the high cost of the constituent although the method is effective in improving the weatherability of the coating composition.

Brachman in U.S. Pat. No. 3,203,919 teaches a coating composition containing a copolymer comprising an alkyl (meth)acrylate of a siloxane such as pentamethyl methacryloxy disiloxane as a comonomeric constituent. In this comonomer, the (meth)acryloxy group $CH_2=CH-CO-O-$ or $CH_2=CCH_3-CO-O-$ is directly bonded to the silicon atom forming a $-C-O-Si-$ linkage. As is known in the art of silicones, the $-C-O-Si-$ linkage is susceptible to hydrolysis as compared to the linkages of $-C-Si-$, $-C-O-C-$ and $-Si-O-Si-$ so that the coating composition taught by Brachman cannot be used to form a coating film of high weatherability.

SUMMARY OF THE INVENTION

The present invention accordingly has an object to provide a novel and improved room temperature-curable coating composition capable of giving a cured coating film having excellent weatherability and free from the above described disadvantages and problems in the coating compositions of the prior art.

Thus, the room temperature-curable coating composition of the present invention comprises, as the resinous constituent, a copolymer which is a product of radical copolymerization of a ternary monomeric mixture composed of:

(A) an alkyl acrylate, an alkyl methacrylate or a combination thereof:

(b) an oligomeric organopolysiloxanylalkyl acrylate or methacrylate having an ω-(meth)acryloxy alkyl group represented by the general formula $$CH_2=CR-CO-O-CH_2 \quad \text{(I)}$$ 

in which R is a hydrogen atom or a methyl group and the subscript n is a positive integer, bonded to the silicon atom which is a member of the polysiloxane structure; and (C) an organosilane compound having at least one hydrolyzable functional group and a radical-polymerizable unsaturated group.

The ternary monomeric mixture should preferably be composed of from 20 to 80% by weight of the monomeric component (A), from 10 to 78% by weight of the monomeric component (B) and from 2 to 30% by weight of the monomeric component (C).

DETAILED DESCRIPTION OF THE PREFERRED EMBODIMENTS

As is described above, the characteristic ingredient in the inventive room temperature-curable coating composition is the specific resinous constituent which is a copolymer defined above. By virtue of this unique resinous constituent, the inventive coating composition can be cured at room temperature and is capable of giving a cured coating film having excellent weatherability. Further, the organosiloxane moiety contained therein is effective to impart the cured coating film prepared from the inventive composition with high resistance against ultraviolet light to retain the luster prolongedly, insusceptibility to deposition of dirt and adhesion of snow, water-repellency and low friction. The inventive coating composition is absolutely free from the problem by the toxicity of isocyanate compounds because the composition is curable at room temperature without using any isocyanate compound as the crosslinking agent. By virtue of the high weatherability of the cured coating film, the inventive coating composition is suitable for outdoor use including coating of buildings, automobiles, railway cars, aircraft and marine vessels as well as electric instruments and others. In the following, detailed description is given on the types and mixing ratio of the respective monomeric components from which the copolymer is obtained by radical copolymerization as well as the conditions for the radical copolymerization.

The monomeric component (A) is an alkyl acrylate, alkyl methacrylate or a combination thereof. The alkyl (meth)acrylate is exemplified by methyl acrylate, ethyl acrylate, propyl acrylate, butyl acrylate, methyl methacrylate, ethyl methacrylate, propyl methacrylate, butyl methacrylate and the like though not limited thereto. Preferably, the monomeric component (A) is selected from ethyl acrylate, methyl methacrylate and butyl acrylate.

The monomeric component (B) is an oligomeric organopolysiloxanylalkyl acrylate or methacrylate having one ω-(meth)acryloxy alkyl group of the above given general formula (I) bonded to the silicon atom which is a member of the oligomeric organopolysiloxane structure. In the general formula (I), R is a hydrogen atom or a methyl group corresponding to the acrylate and methacrylate, respectively. The subscript n in the general formula (I) is a positive integer which is preferably 3. The oligomeric organopolysiloxane structure has 2 to 6 or, preferably, 2 to 4 silicon atoms linked together through oxygen atom or atoms in a linear or cyclic form. Namely, the component (B) is an oligomeric organopolysiloxane exemplified by hexaorgano disiloxanes, octaorgano trisiloxanes, decaorgano tetrasiloxanes, hexaorgano cyclotrisiloxanes and octaorgano cyclotetrasiloxanes, of which at least one of the organic groups is the above defined ω-(meth)acryloxy alkyl group of the general formula (I) bonded to the silicon atom which is a member of the oligomeric organopolysiloxane structure. The other organic groups bonded to the silicon atoms than the ω-(meth)acryloxy alkyl group are each a monovalent hydrocarbon group selected from the class consisting of alkyl groups, e.g., methyl, ethyl, propyl and butyl groups, and aryl groups, e.g., phenyl and tolyl groups.

Such a monomeric compound can be synthesized by the hydrosilation reaction of an oligomeric organopolysiloxane having a hydrogen atom directly bonded to a silicon atom therein and allyl acrylate or methacrylate in the presence of a platinum catalyst. Alternatively, the monomeric compound can be synthesized by the hydrolysis and silanol condensation reaction of an alkoxy silane compound having an ω-(meth)acryloxy alkyl group bonded to the silicon atom either alone or in combination with another dialkoxy silane compound.

Exemplary of the oligomeric organopolysiloxane having a silicon-bonded hydrogen atom are those compounds represented by the following general formulas:

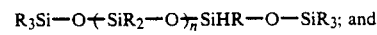

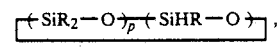

in which R is a monovalent hydrocarbon group such as alkyl groups, e.g., methyl, ethyl, propyl and butyl groups, cycloalkyl groups e.g., cylohexyl group, alkenyl groups, e.g., vinyl and allyl groups, and aryl groups, e.g., phenyl and tolyl groups, as well as those substituted groups obtained by replacing a part or all of the hydrogen atoms in the above named hydrocarbon groups with halogen atoms, cyano groups and the like, m is 0, 1, 2, 3 or 4, n is 0, 1, 2 or 3 and p is 2, 3, 4 or 5.

Particular examples of such an oligomeric organopolysiloxane include 1,1,1,3,3-pentamethyl disiloxane, 1,1,1,3,3,5,5-heptamethyl trisiloxane, 1,1,1,3,3,5,5,7,7-nonamethyl tetrasiloxane, 1,1,1,3,5,5,5-heptamethyl trisiloxane, 1,1,1,3,3,5,-7,7,7-nonamethyl tetrasiloxane, 1,1,1,5,5-pentamethyl-3,3-diphenyl trisiloxane, 1,3,3-trimethyl-1,1-diphenyl disiloxane, 1,3,5-trimethyl-1,3-diethyl cyclotrisiloxane, 1,3,5-trimethyl-1,3-dipropyl cyclotrisiloxane, 1,3,5,7-tetramethyl-1,3,5-triethyl cyclotetrasiloxane, 1,3,5,7-tetramethyl-1,3,5-tripropyl cyclotetrasiloxane and the like.

The hydrosilation reaction can be performed by heating a mixture of the above described oligomeric organopolysiloxane and allyl acrylate or methacrylate with admixture of, for example, an alcoholic solution of chloroplatinic acid as the platinum catalyst at a temperature of 70° to 120° C. so that an acryloxy- or methacryloxy-containing oligomeric organopolysiloxane as the monomeric component (B) can be obtained nearly in a quantitative yield. The thus obtained acryloxy- or methacryloxy-containing oligomeric organopolysiloxanes generally have a viscosity not much higher than that of acrylic or methacrylic esters so that they can be easily purified by a conventional method.

The monomeric component (C) to be copolymerized with the above described monomeric components (A) and (B) is an organosilane compound having at least one or, preferably, 2 or 3 hydrolyzable groups and a polymerizable unsaturated group in a molecule. The hydrolyzable group implied here includes alkoxy groups, e.g., methoxy, ethoxy, propoxy and butoxy groups, and alkenyloxy groups, e.g., isopropenyloxy group. Further, the polymerizable unsaturated group includes vinyl, 3-acryloxypropyl and 3-methacryloxypropyl groups. Accordingly, the organosilane compound is represented by the general formula $$R^1R_qSi(OR^2)_{q-3},$$

in which $R^1$ is a polymerizable unsaturated group selected from the class consisting of vinyl group, 3-acryloxypropyl group and 3-methacryloxypropyl group, R has the same meaning as defined above, $R^2$ is an alkyl group or alkenyl group and q is 0 or 1. Particular examples of such an organosilane compound include vinyl trimethoxy silane, vinyl triethoxy silane, vinyl methyl dimethoxy silane, vinyl methyl diethoxy silane, 3-methacryloxypropyl trimethoxy silane, 3-methacryloxypropyl methyl dimethoxy silane, 3-acryloxypropyl trimethoxy silane, 3-acryloxypropyl methyl dimethoxy silane, vinyl triisopropenyloxy silane, vinyl methyl diisopropenyloxy silane, 3-methacryloxypropyl triisopropenyloxy silane, 3-methacryloxypropyl methyl diisopropenyloxy silane and the like, of which vinyl triethoxy silane and 3-methacryloxypropyl trimethoxy silane are preferred. 3-Methacryloxypropyl trimethoxy silane is the most preferable in respect of the high radical-polymerizability.

The copolymerization of the above described monomeric components (A), (B) and (C) can be performed in any of conventional methods. For example, a mixture of these monomeric components is admixed with a radical polymerization initiator and heated to start the copolymerization reaction. Alternatively, a mixture of the monomeric components is irradiated with high-energy radiation so that the copolymerization reaction of the monomers proceeds radiation-chemically. Preferable is the former method by using a radical polymerization initiator from the standpoint of convenience in the procedure. Suitable radical polymerization initiators include azo compounds such as azobisisobutyronitrile and the like and organic peroxides such as benzoyl peroxide and the like. Although the copolymerization reaction can be performed as bulk polymerization without using any solvent, it is more advantageous that the copolymerization reaction is performed as solution polymerization by diluting the monomeric mixture with a suitable organic solvent. Various kinds of organic solvents can be used for the purpose including aromatic hydrocarbon solvents such as benzene, toluene and xylene, aliphatic hydrocarbon solvents such as hexane, heptane, octane, ligroin and mineral spirit, ketones such as acetone, methyl ethyl ketone, methyl isobutyl ketone and ethers such as tetrahydrofuran and dioxane, of which toluene and xylene are preferred in respect of the good compatibility with the resinous ingredient in the coating composition, easiness in handling and good workability of the coating composition prepared by using the same.

The average molecular weight of the copolymer obtained in the above described manner can be easily controlled by adequately selecting various parameters in the copolymerization reaction. When a coating composition containing the resinous non-volatile constituent in a high content is desired, the average molecular weight of the copolymer should not be excessively large so that the copolymerization reaction should be performed preferably in the presence of a chain transfer agent. Suitable chain transfer agents include mercaptans and related compounds such as n-dodecyl mercaptan, tert-dodecyl mercaptan, butyl mercaptan and 3-mercaptopropyl trimethoxy silane and halogenated hydrocarbon compounds such as carbon tetrachloride and carbon tetrabromide.

The monomeric mixture to be subjected to the copolymerization reaction should be composed of the monomeric components (A), (B) and (C) in a limited proportion. Thus, the amount of the monomeric component (A) in the mixture should be in the range from 20 to 80% by weight or, preferably, from 30 to 80% by weight. When the amount of the monomeric component (A) is too small, the cured coating film of the composition may have somewhat increased permeability to gases, moisture and water resulting in decreased adhesion to the substrate surface as well as decreased protection of the substrate surface against corrosion. When the amount thereof is too large, on the other hand, the weatherability of the cured coating film may be decreased. The amount of the monomeric component (B) in the mixture should be in the range from 10 to 78% by weight or, preferably, from 10 to 60% by weight. When the amount thereof is too large, the cured coating film of the composition may have increased permeability to gases, moisture and water, not to mention the economical disadvantage due to the high cost of the compound. When the amount thereof is too small, on the other hand, the cured coating film of the composition is less resistant against weathering.

The amount of the monomeric component (C) in the mixture should be in the range from 2 to 30% by weight or, preferably, from 5 to 15% by weight. When the amount thereof is too small, the coating composition cannot give a cured coating film having excellent resistance against organic solvents due to the deficiency in the density of crosslinks after curing. When the amount thereof is too large, on the other hand, the coating composition may have somewhat decreased stability to lose the balance between the curability and stability.

It is optional that the inventive coating composition is admixed with various kinds of fillers and pigments such as various types of finely divided silica powders, calcium carbonate, magnesium carbonate, titanium dioxide, iron oxide, glass fibers and the like. When the filler or pigment contains moisture in the form of, for example, adsorbed water or water of crystallization, it is advantageous that the coating composition is admixed with a small amount of an alkoxy silane comopound such as tetramethoxy silane, tetraethoxy silane, methyl trimethoxy silane, ethyl triethoxy silane and the like or a lower alcohol such as methyl alcohol, ethyl alcohol, isopropyl alcohol, butyl alcohol and the like as a stabilizing agent, which, of course, has no particular advantageous effect when the filler or pigment is almost free from water content. It is of course preferable that the filler or pigment is absolutely dry in order to ensure good stability of the inventive coating composition.

The inventive coating composition can be cured to give a cured coating film by the crosslinking reaction gradually proceeding at room temperature even in the absence of any catalyst by virtue of the hydrolyzable groups or, in particular, the alkoxy or alkenyloxy groups introduced into the copolymer by the copolymerization of the monomeric component (C) since the alkoxy or alkenyloxy groups pertain to the dealcoholation or deketonation reaction to form silanol groups followed by the silanol condensation reaction even in the absence of a catalyst. It is advantageous, however, that the coating composition is admixed with a curing accelerator to enhance the velocity of curing along with an increase in the crosslinking density in the cured coating film as well as improvements in the weatherability of the cured coating film and adhesiveness between the cured coating film and the substrate surface.

The curing accelerator may be any of the compounds effective as a catalyst to promote the condensation reaction of silicon-bonded alkoxy or alkenyloxy groups including organic tin compounds such as dibutyl tin dioctoate, dibutyl tin dilaurate, tin caprylate, dibutyl tin maleate and the like, organic titanate compounds such as propyl titanate, butyl titanate and the like either in the monomeric form or in the form of an oligomer, amine compounds such as ethylene diamine, triethylene tetramine, dimethyl hexyl amine, dimethyl octyl amine, dimethyl dodecyl amine, 3-(2-aminoethyl amino)propyl trimethoxy silane, 3-aminopropyl triethoxy silane and the like, acids such as p-toluene sulfonic acid, phthalic acid and the like, and so on. The amount of the curing accelerator added to the inventive coating composition should be in the range from 0.001 to 10% by weight or, preferably, from 0.01 5% by weight based on the amount of the resinous ingredient.

The inventive coating composition can be used for coating substrates of various kinds of materials including metals, plastics, ceramics and woody materials. The coating film can be cured at room temperature on the substrate surface to give a cured coating film firmly adhering to the substrate surface and having excellent weatherability. The cured coating film is also highly resistant against ultraviolet light to retain the high lustrous appearance even after prolonged exposure to ultraviolet by virtue of the siloxane linkages as the crosslinks introduced by the hydrolysis of the hydrolyzable groups in the monomeric component (C). The cured coating film is highly resistant against water or moisture because of the absence of any readily hydrolyzable linkages such as the silicon-oxygen-carbon linkages. By virtue of the highly crosslinked structure of the copolymer after curing, the cured coating film has excellent heat and cold resistance and is highly resistant against solvents and chemicals. Thus, the room temperature-curable coating composition of the present invention is industrially very advantageous with high practical value by virtue of the much higher performance than the conventional room temperature-curable acrylic resin-based coating compositions known in the prior art.

In the following, the room temperature-curable coating compositions of the present invention are described in more detail by way of examples in which the term of "parts" always refers to "parts by weight" and the values of viscosity are all those obtained by the measurement at 25° C. The room temperature-curable coating compositions prepared in the examples were evaluated for various properties by the testing procedures shown below.

Pencil hardness: measurement was performed according to the method of pencil scratching test specified in JIS K 5400, item 6.14.

Checkerboard adhesion test: similarly to the method of checkerboard test specified in JIS K 5400, item 6.15, the cured coating film formed on a test panel of steel was cut using a cutter blade to form 6 parallel incision lines with 2 mm intervals in each of the down and across directions to form 25 checkerboard squares and then a pressure-sensitive adhesive tape was applied and bonded to the surface of the coating film followed by forcible peeling of the tape to count the number of checkerboard squares of the coating film left on the test panel without being lifted by the adhesive tape.

Flexibility: according to the method of bending test specified in JIS K 5400, item 6.16, the test panel of steel on which a cured film of the coating composition was formed was bent by 180° around a mandrel of 2 mm diameter to examine the condition of the coating film.

Solvent resistance: The cured film of the coating composition formed on a test panel was rubbed with a 1 cm by 1 cm wide piece of absorbent cotton wet with xylene under a load of 50 g to count the number of the back-and-forth movements of the cotton piece until certain undesirable changes were noted in the appearance of the coating film such as peeling or shrinkage of the coating film and decrease of the surface luster.

Water resistance: after immersion in water for 7 days, the condition of the cured coating film formed on a test panel of steel was visually examined.

Accelerated weathering test: the cured coating film on a test panel of steel was exposed to ultraviolet light for 1000 hours of the overall length of time including repeated cycles of the conditions, each cycle being composed of 8 hours in a dry atmosphere at 70° C. and 4 hours in a wet atmosphere at 50° C. and measurements were performed for the % retention of surface luster and discoloration $\Delta E$, which is defined by $\Delta E = \sqrt{L^2 + a^2 + b^2}$, L, a and b being the luminosity, saturation of color and hue, respectively.

Heat resistance: the cured coating film was heated at 200° C. for 200 hours to determine the % retention of the surface luster.

Salt spray test: the cured coating film on a test panel was exposed to spray of a 5% aqueous solution of sodium chloride for 100 hours according to the method specified in JIS Z 2371 and the outer appearance of the coating film was visually examined.

EXAMPLE 1

Into 63 parts of allyl methacrylate admixed with 0.04 part of chloroplatinic acid in the form of an isopropyl alcohol solution and heated at 60° 70° C. were added dropwise gradually 111 parts of 1,1,1,3,5,5,5-heptamethyl trisiloxane and, after completion of the dropwise addition of the silane compound, the mixture was heated at 90° C. for further 2 hours to complete the reaction. Thereafter, the reaction mixture was distilled under reduced pressure to be freed from the unreacted reactants and then filtered to give 1,1,1,3,5,5,5- heptamethyl-3-(3-methacryloxypropyl) trisiloxane, which is referred to as the compound B-1 hereinbelow, in a yield of 165 parts corresponding to 95% of the theoretical yield.

A copolymerization reaction was performed by adding dropwise a mixture composed of 67 parts of methyl methacrylate, 25 parts of the above obtained compound B-1, 8 parts of 3-methacryloxypropyl trimethoxy silane and 2 parts of azobisisobutyronitrile into 100 parts of xylene kept at 90° C. and by further heating the polymerization mixture at the same temperature for additional 8 hours after completion of the dropwise addition of the monomer mixture. After completion of the copolymerization reaction, the polymerization mixture was admixed with 5 parts of isopropyl alcohol and cooled to room temperature. The thus obtained reaction product had a viscosity of 450 centistokes and contained 49% of non-volatile matter, of which the copolymer had an average molecular weight of 9000 with reference to polystyrenes.

In the next place, 100 parts of the copolymer solution were admixed with 19.6 parts of titanium dioxide and 2 parts of dibutyl tin dioctate and the mixture was thoroughly blended in a ball mill to give a white-pigmented coating composition. A test panel of steel was coated with the coating composition by spraying in a coating thickness of about 30 μm as dried and kept standing at room temperature for 7 days to cure the coating film. Testing of the thus cured coating film was performed in the above described manner to give the results shown in Table 1 given below.

EXAMPLE 2

Similarly to Example 1, 366 parts of 1,3,5,7-tetramethyl-1,3,5-tripropyl cyclotetrasiloxane were gradually added dropwise to 126 parts of allyl methacrylate admixed with 0.01 part of chloroplatinic acid in the form of an isopropyl alcohol solution and kept at a temperature of 60° to 70° C. and the mixture was further heated at 90° C. for additional 4 hours after completion of the dropwise addition of the siloxane compound. Thereafter, the reaction mixture was distilled under reduced pressure to be freed from the unreacted reactants and then filtered to give 1,3,5,7-tetramethyl-1,3,5-tripropyl-7-(3-methacryloxypropyl) cyclotetrasiloxane, which is referred to as the compound B-2 hereinbelow, in a yield of 477 parts corresponding to 97% of the theoretical yield.

A copolymerization reaction was performed by adding dropwise a mixture composed of 67 parts of methyl methacrylate, 25 parts of the above obtained compound B-2, 8 parts of 3-methacryloxypropyl trimethoxy silane and 2 parts of azobisisobutyronitrile into 100 parts of xylene kept at 90° C. and by further heating the polymerization mixture at 90° C. for additional 8 hours. After completion of the copolymerization reaction, the mixture was admixed with 5 parts of isopropyl alcohol and cooled to room temperature. The thus obtained reaction product had a viscosity of 550 centistokes and contained 50% of non-volatile matter, of which the copolymer had an average molecular weight of 10,000 with reference to polystyrenes.

In the next place, this copolymer solution was admixed with titanium dioxide and dibutyl tin dioctoate in the same manner as in Example 1 to give a white-pigmented coating composition. Testing of the thus prepared coating composition was performed also in the same manner as in Example 1 to give the results shown in Table 1.

EXAMPLE 3

A copolymerization reaction was performed in the same manner as in Example 2 except that the monomer mixture added to 100 parts of xylene was composed of 60 parts of methyl methacrylate, 32 parts of the compound B-2 prepared in Example 2, 8 parts of 3-methacryloxypropyl trimethoxy silane and 2 parts of azobisisobutyronitrile. After completion of the copolymerization reaction, the mixture was admixed with 5 parts of isopropyl alcohol and cooled to room temperature to give a copolymer solution having a viscosity of 600 centistokes and containing 49% of non-volatile matter, of which the copolymer had an average molecular weight of 12,000 with reference to polystyrenes.

The thus prepared copolymer solution was processed into a white-pigmented coating composition in the same manner as in Example 1 and tested also in the same manner as in Example 1 to give the results shown in Table 1.

COMPARATIVE EXAMPLE 1

A copolymerization reaction was performed by adding dropwise a mixture composed of 50 parts of methyl methacrylate, 20 parts of ethyl acrylate, 30 parts of butyl acrylate and 2 parts of azobisisobutyronitrile into 80 parts of xylene kept at 90° C. and by further heating the mixture at 90° C. for additional 8 hours to give a copolymer solution having a viscosity of 1500 centistokes and containing 51% of non-volatile matter, of which the copolymer had an average molecular weight of 20,000 with reference to polystyrenes.

In the next place, 100 parts of the copolymer solution were admixed with 22.8 parts of titanium dioxide and 30 parts of toluene and the mixture was thoroughly blended in a ball mill to give a white-pigmented coating composition, which was subjected to testing in the same manner as in Example 1 to give the results shown in Table 1.

COMPARATIVE EXAMPLE 2

A copolymerization reaction was performed by adding dropwise a mixture composed of 82 parts of methyl methacrylate, 11 parts of butyl acrylate, 7 parts of 3-methacryloxypropyl trimethoxy silane and 2 parts of azobisisobutyronitrile into 100 parts of xylene kept at 90° C. and by further heating the mixture at 90° C. and by further heating the mixture at 90° C. for additional 8 hours to give a copolymer solution having a viscosity of 300 centistokes and containing a 51% of non-volatile matter, of which the copolymer had an average molecular weight of 7000 with reference to polystyrenes. This copolymer solution was admixed with titanium dioxide and dibutyl tin dilaurate in the same manner as in Example 1 to give a white-pigmented coating composition, which was subjected to testing in the same manner as in Example 1 to give the results shown in Table 1.

COMPARATIVE EXAMPLE 3

A copolymerization reaction was performed in the same manner as in Example 1 except that the monomer mixture added to 100 parts of xylene was composed of 65 parts of methyl methacrylate, 20 parts of butyl acrylate, 5 parts of the compound B-2 prepared in Example 2 and 10 parts of 3-methacyloxypropyl trimethoxy silane with admixture of 2 parts of azobisisobutyronitrile to give a copolymer solution having a viscosity of 700 centistokes and containing 49% of non-volatile matter, of which the copolymer had an average molecular weight of 12,000 with reference to polystyrenes.

The thus obtained copolymer solution was processed in the same manner as in Example 1 into a white-pigmented coating composition which was subjected to testing to give the results also shown in Table 1.

TABLE 1

| Testing item | Example | | | Comparative Example | | |
|---|---|---|---|---|---|---|
| | 1 | 2 | 3 | 1 | 2 | 3 |
| Pencil hardness | 2H | 2H | 2H | 3H | 2H | 2H |
| Checkerboard adhesion test | 25/25 | 25/25 | 25/25 | 0/25 | 0/25 | 15/25 |
| Flexibility | No peeling | | | Complete peeling | | |
| Heat resistance, % retention of luster at 200° C. | 93 | 95 | 98 | 45 | 68 | 75 |
| Solvent resistance, times of rubbing | At least 100 | | | 3 | At least 100 | |
| Water resistance | No changes | | | Many blis- | No changes | |

TABLE 1-continued

| Testing item | Example | | | Comparative Example | | |
|---|---|---|---|---|---|---|
| | 1 | 2 | 3 | 1 | 2 | 3 |
| Accelerated weathering, % retention of luster | 98 | 98 | 100 | ters 10 | 40 | 65 |
| Accelerated weathering, discoloration ΔE | 1 | 2 | 1 | 4 | 3 | 3 |
| Salt spray test | No changes | | | Peeling | | Many blisters |

What is claimed is:

1. A room temperature-curable coating composition which comprises, as the resinous constituent, a copolymer which is a product of radical copolymerization of a ternary monomeric mixture consisting of:
   (A) from 20 to 80% by weight of a first monomeric component which is an alkyl acrylate, an alkyl methacrylate or a combination thereof:
   (B) from 10 to 78% by weight of a second monomeric component which is an oligomeric organopolysiloxyalkyl acrylate or methacrylate having 2 to 6 silicon atoms and an w-(meth)acryloxy alkyl group represented by the general formula $CH_2=CR-CO-O-(-CH_2)_n$ in which R is a hydrogen atom or a methyl group and the subscript n is a positive integer, bonded to the silicon atom which is a member of the polysiloxane structure; and
   (C) from 2 to 30% by weight of a third monomeric component which is an organosilane compound having at least one hydrolyzable functional group and a radical-polymerizable unsaturated group.

2. The room temperature-curable coating composition as claimed in claim 1 wherein the alkyl acrylate as the first monomeric component (A) in the ternary monomeric mixture is selected from the group consisting of methyl acrylate, ethyl acrylate, propyl acrylate and butyl acrylate.

3. The room temperature-curable coating composition as claimed in claim 1 wherein the alkyl methacrylate as the first monomeric component (A) in the ternary monomeric mixture is selected from the group consisting of methyl methacrylate, ethyl methacrylate, propyl methacrylate and butyl methacrylate.

4. The room temperature-curable coating composition as claimed in claim 1 wherein the subscript n in the general formula representing the ω-(meth)acryloxy alkyl group is 3.

5. The room temperature-curable coating composition as claimed in claim 1 wherein the oligomeric organopolysiloxanylalkyl acrylate or methacrylate is selected from the group consisting of 1,1,1,3,3-pentamethyl-3-(3-acryloxypropyl) disiloxane, 1,1,1,3,3-pentamethyl-3-(3-methacryloxypropyl) disiloxane, 1,1,1,3,3,5,5-heptamethyl-5-(3-acryloxypropyl) trisiloxane, 1,1,1,3,3,5,5-heptamethyl-5-(3-methacryloxypropyl) trisiloxane, 1,1,1,3,3,5,5,7,7-nonamethyl-7-(acryloxypropyl) tetrasiloxane, 1,1,1,3,3,5,5,7,7-nonamethyl-7-(methacryloxypropyl) tetrasiloxane, 1,1,1,3,5,5,5-heptamethyl-3-(3-acryloxypropyl) trisiloxane, 1,1,1,3,5,5,5-heptamethyl-3-(3-methacryloxypropyl)trisiloxane, 1,1,1,3,3,5,7,7,7-nonamethyl-5-(3-acryloxypropyl) tetrasiloxane, 1,1,1,3,3,5,7,7,7-nonamethyl-5-(3-methacryloxypropyl) tetrasiloxane, 1,1,1,5,5-pentamethyl-3,3-diphenyl-5-(3-acryloxypropyl) trisiloxane, 1,1,1,5,5-penta-methyl-3,3-diphenyl-5-(3-methacryloxypropyl) trisiloxane, 1,3,3-trimethyl-1,1-diphenyl-3-(3-acryloxypropyl) disiloxane, 1,3,3-trimethyl-1,1-diphenyl-3-(3-methacryloxypropyl) disiloxane, 1,3,5-trimethyl-1,3-diethyl-5-(3-acryloxypropyl) cyclotrisilox-ane, 1,3,5-trimethyl-1,3-diethyl-5-(3-methacryloxypropyl) cyclotrisiloxane, 1,3,5-trimethyl-1,3-dipropyl-5-(3-acryloxypropyl) cyclotrisiloxane, 1,3,5-trimethyl-1,3-dipropyl-5-(3-methacryl-oxypropyl) cyclotrisiloxane, 1,3,5,7-tetramethyl-1,3,5-triethyl-7-(3-acryloxypropyl) cyclotetrasiloxane, 1,3,5,7-tetra-methyl-1,3,5-triethyl-7-(3-methacryloxypropyl) cyclotetrasiloxane, 1,3,5,7-tetramethyl-1,3,5-tripropyl-7-(3-acryloxy-propyl) cyclotetrasiloxane, 1,3,5,7-tetramethyl-1,3,5-tripropyl-7-(3-methacryloxypropyl) cyclotetrasiloxane, 1,3,5,7-tetramethyl-1,3,5-tri(2-phenylethyl)-7-(3-acryloxypropyl) cyclotetrasiloxane and 1,3,5,7-tetramethyl-1,3,5-tri(2-phenylethyl)-7-(3-methacryloxypropyl) cyclotetrasiloxane.

6. The room temperature-curable coating composition as claimed in claim 1 wherein the hydrolyzable functional group in the third monomeric component is an alkoxy group or an alkenyloxy group.

7. The room temperature-curable coating composition as claimed in claim 1 wherein the radical-polymerizable unsaturated group in the third monomeric component is selected from the group consisting of vinyl, 3-acryloxypropyl and 3-methacryloxypropyl groups.

8. The room temperature-curable coating composition as claimed in claim 1 wherein the the third monomeric component is selected from the group consisting of vinyl trimethoxy silane, vinyl triethoxy silane, vinyl methyl dimethoxy silane, vinyl methyl diethoxy silane, 3-methacryloxypropyl trimethoxy silane, 3-methacryloxypropyl methyl dimethoxy silane, 3-acryloxypropyl trimethoxy silane, 3-acryloxypropyl methyl dimethoxy silane, vinyl triisopropenyloxy silane, vinyl methyl diisopropenyloxy silane, 3-methacryloxypropyl triisopropenyloxy silane and 3-methacryloxypropyl methyl diisopropenyloxy silane.

9. The room temperature-curable coating composition as claimed in claim 1 wherein the third monomeric component is vinyl triethoxy silane or 3-methacryloxypropyl trimethoxy silane.

10. The room temperature-curable coating composition as claimed in claim 1 wherein the ternary monomeric mixture is composed of from 30 to 80% by weight of the first monomeric component (A), from 10 to 60% by weight of the second monomeric component (B) and from 5 to 15% by weight of the third monomeric component (C).

* * * * *